July 10, 1956     E. E. BEHNKE     2,753,662
PLANT PROTECTOR
Filed June 10, 1953
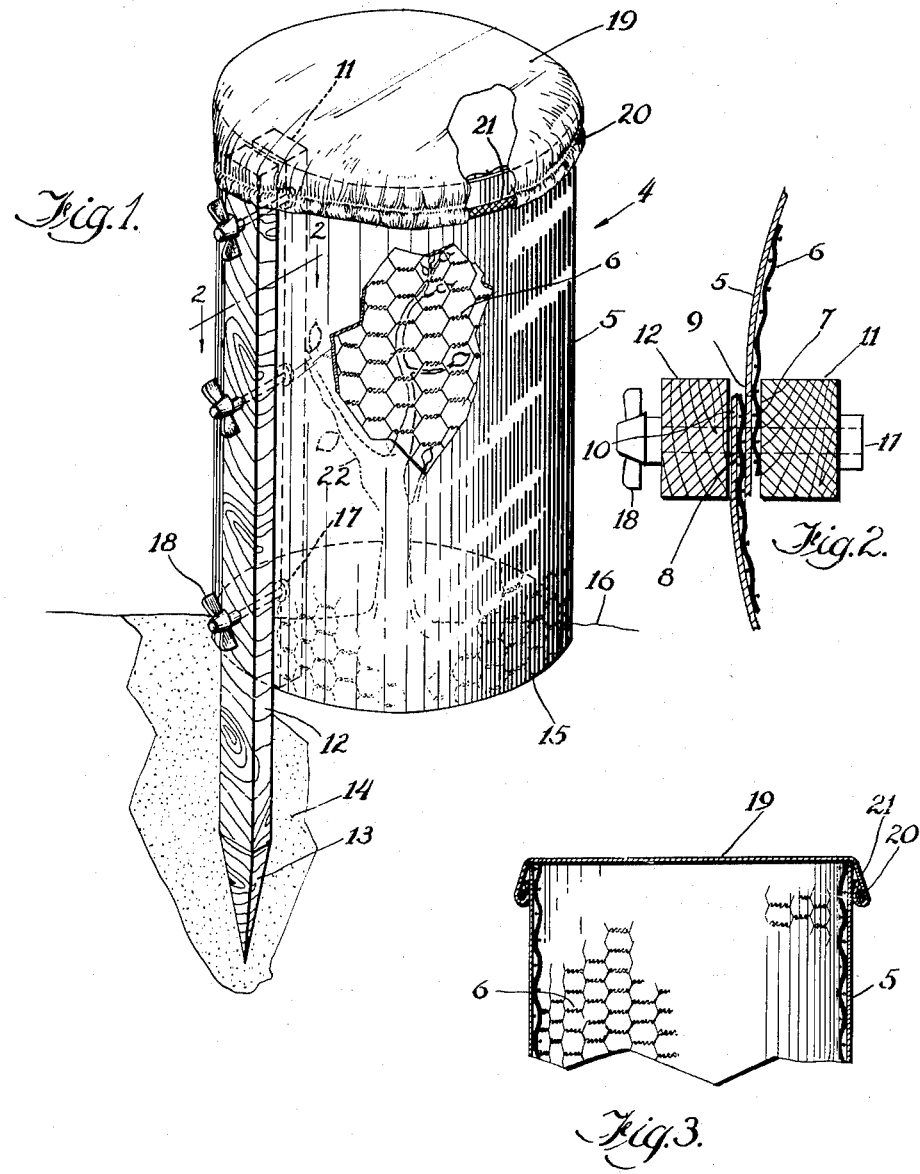
INVENTOR.
*Ervin E. Behnke*
BY
*David Manly Heller*
Attorney

United States Patent Office 2,753,662
Patented July 10, 1956

2,753,662
PLANT PROTECTOR

Ervin E. Behnke, Sawyer, Mich.

Application June 10, 1953, Serial No. 360,664

1 Claim. (Cl. 47—29)

My invention relates to plant protectors used for the protection of horticultural growths.

An important object of my invention is to provide an article of the aforementioned character which will protect plant growths and which will not impede the growth thereof; permitting the sun and the rain to reach those plants, protecting them against frost conditions only.

Another object of my invention is to provide an article of the aforementioned character which is adapted to enclose and completely cover a plant without impeding or impairing its growth.

A still further object of my invention is to provide an article of the aforementioned character which may be readily assembled, and just as readily taken part and stored when not in use so as to occupy a minimum of storage space.

A still further object of my invention is to provide in an article of the aforementioned character a frost cap which is removably secured so that the same may be detached or removed in the daytime allowing the sun and rain to reach the plant.

A still further object of my invention is to provide a plant protector of substantially tubular configuration made up of a wire section arranged in overlapping relationship, the said wire section being covered by a translucent or transparent plastic material, also in overlapping relationship, and cleat means adapted to hold the tubular configuration of the body element thereof, one of the cleat sections being provided with an extending pointed terminus portion which can be driven into the ground so as to rigidly secure the plant protector in place and prevent it from being dislodged by the wind and the elements.

Other objects and advantages inherent in my invention will become apparent from an examination of the accompanying drawings, bearing further elucidation in the ensuing description, wherein like symbols are used to designate like parts, and in which;

Fig. 1 is a perspective view of my invention shown as it would be positioned about a plant indicated in phantom lines.

Fig. 2 is a cross-sectional view taken, substantially, on the lines 2—2 of Fig. 1.

Fig. 3 is a fragmentary, longitudinal, sectional view of Fig. 1 taken along a plane on the median line thereof.

Referring to the various views, my invention is generally designated 4 and consists of a body element made up of a wire section 6, commonly known as "chicken wire." The said wire is large enough so as to be arranged and disposed in overlapping relationship with its end edges 7 and 8 arranged to overlap. The said chicken wire element 6 is enveloped in a plastic element 5, of transparent, or translucent, properties which is also caused to overlap by virtue of its edges 9 and 10 as indicated in Fig. 2.

The said body is assembled and held in place by means of a pair of cleats, an internal cleat 11 and an external cleat 12. The external cleat 12 is longer and has a terminus of pointed shape 13 adapted to be embedded in the ground or soil 14, so that the body unit will rest above the ground, its bottom edge 15 resting on the surface of the soil 16.

The cleated elements are assembled to the overlapping wire and plastic elements 6 and 5 by means of the headed bolts 17 and the wingnuts 18 so that the entire body can be dismantled in the wintertime when it is no longer needed in use, the bolts are removed, the wire and the plastic material are arranged in superimposition and laid out flat so as to occupy a minimum of storage space.

For the nighttime the plant is covered, to protect it against frost, by means of the frost cap 19, which is also made of a plastic material of translucent or transparent properties, and which has a gathered edge 20 in which is confined the endless elastic element 21, thus permitting the plastic cap 19 to be secured to the body at the top thereof, forming a complete enclosure preventing snow, sleet and frost from attacking the plant 22.

It will also be noted that in the use, during the daytime, the frost caps 19 are removed, thus allowing the sun and rain to reach the horticultural growth or plant 22. The transparent or translucent properties of the body element 5 will permit the sun's rays to reach the plant through the sides, thus aiding its natural and normal growth.

Although the drawings and the above specification disclose the best modes in which I have contemplated embodying my invention, I desire to be in no way limited to the details of such disclosure, for in the further practical application of my invention many changes in the form and construction thereof may be made as circumstances require or experience suggests without departing from the spirit of the invention as expounded within the scope of the appended claim.

Having thus described and revealed my invention, what I claim as new and desire to secure by Letters Patent is:

A plant protector, comprising a substantially cylindrical body adapted to form an enclosure for an horticultural plant, said body including a wire element of rectangular formation, and a transparent plastic element of rectangular formation, said elements being arranged congruently with opposed edges in overlapping relationship defining a substantially cylindrical body, a pair of vertical inner and outer cleats positioned along said opposed edges, bolt and nut means securing said opposed edges and cleats, one of said cleats extending below said body defining a pointed terminus adapted to be embedded in the soil, the bottom edge of said body resting on said surface, and a transparent frost cap removably attachable to the top of said body.

References Cited in the file of this patent

UNITED STATES PATENTS

| 1,764,442 | Hansen | June 17, 1930 |
| 2,226,812 | Goldberg | Dec. 31, 1940 |
| 2,649,102 | McDonough | Aug. 18, 1953 |

FOREIGN PATENTS

| 82,449 | Germany | July 31, 1895 |
| 17,031 | Great Britain | Aug. 22, 1905 |